Nov. 6, 1934.　　　H. H. RAYMOND　　　1,979,705
AIRPLANE GASOLINE GAUGE
Filed Nov. 26, 1929
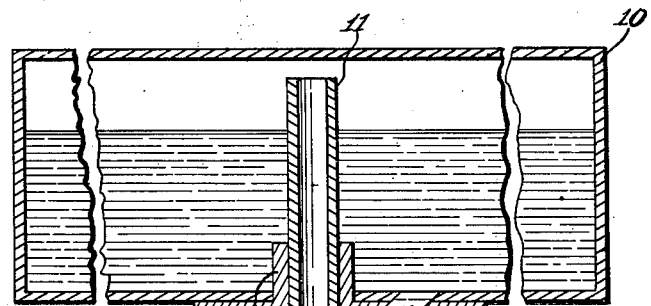
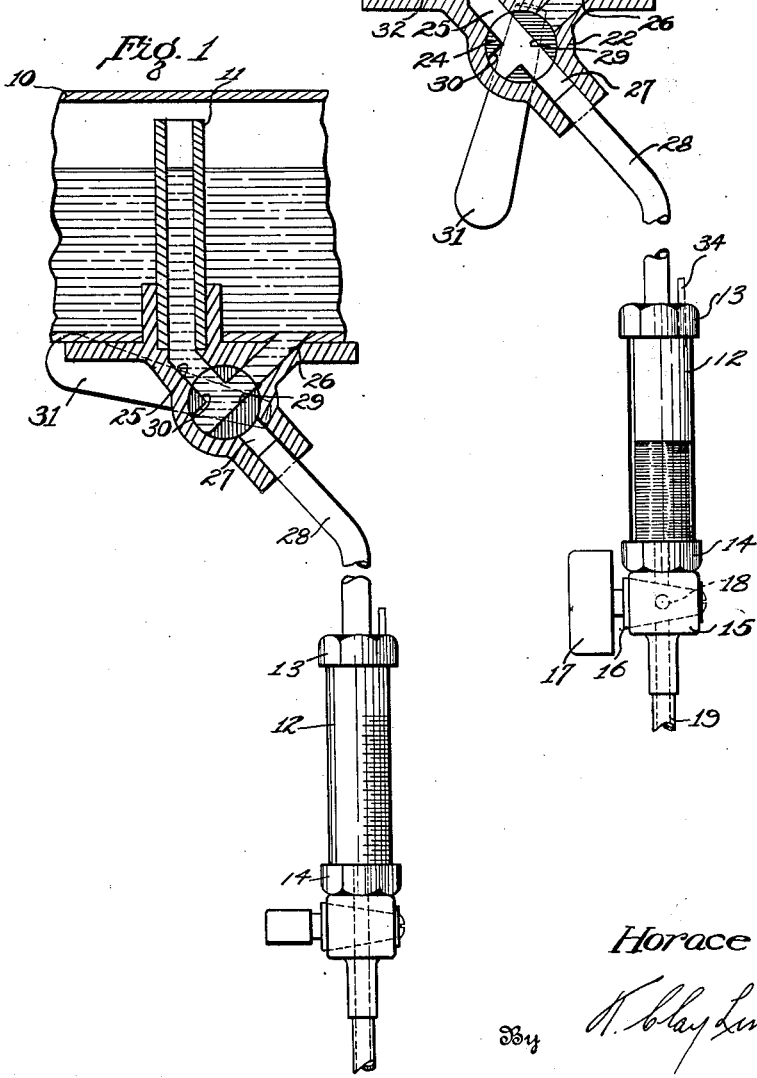
Inventor
Horace H. Raymond
By W. Clay Lindsey
Attorney

73. MEASURING AND TESTING.

Patented Nov. 6, 1934

1,979,705

UNITED STATES PATENT OFFICE 1,979,705

AIRPLANE GASOLINE GAUGE

Horace H. Raymond, Berlin, Conn., assignor to The Stanley Works, New Britain, Conn., a corporation of Connecticut Application November 26, 1929, Serial No. 409,945

4 Claims. (Cl. 73—54)

This invention relates generally to liquid gauges, and has particular reference to a gauge device for use in determining the amount of gasoline in the tanks of airplanes and the like.

The aim of the present invention is to provide a very simple, reliable and satisfactory device by means of which the aviator may, at any time he desires, and under almost any conditions, accurately determine the amount of gasoline within the tank or tanks. By the use of my improved device, the problems and uncertainties presented by airplane gasoline gauges, as heretofore constructed, are practically eliminated.

Other objects will be in part obvious and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawing, wherein I have shown one of the many embodiments which the present invention may take:

Figure 1 is a view illustrating more or less diagrammatically my improved construction with the stand pipe within the tank in communication with the tank; and Figure 2 is a view similar to Figure 1, but showing the stand pipe in connection with the transparent gauge tube.

Referring to the drawing in detail, 10 designates a tank for holding gasoline or the like, and it may be assumed that this tank is located in the overhead wing of an airplane. The tank is located, by preference, above the cockpit. No part of the airplane is shown as the particular construction thereof forms no part of the present invention. It is old to provide in the wings of airplanes tanks for containing the gasoline. Within the tank is a stand pipe 11, preferably open at its upper end so that the gasoline within this pipe is subjected to the same pressure as the gasoline about the pipe. The stand pipe 11 is preferably positioned centrally of the tank at which point the level of the gasoline is substantially constant irrespective of changes in the inclination of the airplane. Thus whether or not the airplane is on an even keel, the height to which the gasoline rises in the stand pipe, when the latter is in communication with the tank, is practically the same.

Located preferably below the tank and also, by preference, within the cockpit, where it may be readily observed by the pilot, is a gauge, per se, which is in the form of a vertical glass tube 12, closed at its upper and lower ends by members 13 and 14. This gauge may be of any suitable type, that shown in the drawing being by way of exemplification only. At the lower end of the glass gauge is a cock by means of which the gauge may be drained at will. This cock may be of any suitable construction so long as it will permit the lower end of the gasoline gauge to be closed when it is desired to determine the amount of gasoline in the tank, and which will permit the glass tube to be drained after the gauging operations are completed. As shown in the drawing, this cock is in the form of a casing 15 within which is a ground valve 16 having a handle 17 and a diametrical port 18. Leading from the valve casing 15 is a drain tube 19.

In accordance with the present invention, means are provided for selectively establishing communication between the lower end of the tank and the stand pipe 11, and between the stand pipe and the glass tube 12. This means, in the present instance, is in the form of a three-way cock or valve. This valve has a casing 22 suitably positioned at the bottom of the tank and provided with a valve chamber in which is a valve head 24. Leading from the valve chamber to the bottom of the stand pipe is a port 25; from the valve chamber to the bottom of the tank a port 26, and from the valve chamber a third port 27. This latter port is connected to the upper end of the glass gauge by a tube 28. This valve head 24 has a diametrical opening 29 from which leads a branch 30. The valve may have a suitable operating member, such as a handle 31. In the present instance, the valve casing 22 has a nipple 32 extending up into the tank and the lower end of the stand pipe 11 has a fluid tight fit in this nipple. The numeral 34 indicates a vent for the glass tube.

The operation of my improved arrangement is briefly as follows: When it is desired to measure the height of the gasoline within the tank, the valve 24 is turned to the position shown in Figure 1 and wherein communication between the tank and the stand pipe is established through the opening 29 and the branch 30 and at this time communication between the stand pipe and the tank on one hand, and the glass tube on the other hand is cut off. The glass tube has been drained by moving the ground valve 16 to the open position shown in Figure 1, and it is then turned to the closed position shown in Figure 2. When the valve is in the position shown in Figure 1, the gasoline will rise in the stand pipe to approximately the same height as the mean height of the gasoline within the tank. As previously stated, the stand pipe is located centrally of the tank so that no errors are introduced should the gauging operation be carried out when the airplane is not on an even keel. A column of gasoline now having been formed within the chamber or bore of the stand pipe, and of the same height as the height of the gasoline within the tank, the valve 24 is turned to the position shown in Figure 2 so as to cut off communication between the tank and the stand pipe and to establish communication between the stand pipe and the glass tube. The column of gasoline within the stand pipe will now flow into the glass tube as shown in Figure 2. The interior diameter of the glass tube may be of the same diameter as the bore of the stand pipe, or it may be of a different diameter, but in any event, the glass tube, by preference, will bear graduations which are suitably calibrated. By observing the height of the column of gasoline in the tube, the aviator may readily determine the height of the gasoline in the tank. After the reading has been had, the glass tube may be drained. If desired, an arrangement may be provided for conducting the gasoline from the glass tube back to the tank.

It will be observed from the foregoing description taken from the foregoing drawings, that by the use of my improved gauge an aviator may very accurately and reliably determine the amount of gasoline he has on hand at any desired time and under any conditions. The gauging of the gasoline within the tank is positive and substantially foolproof. Errors and unreliable factors, which may be introduced by the use of floats or other devices, are entirely eliminated.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In combination, a tank, a member forming a chamber in which the liquid is adapted to rise to substantially the same height as the liquid within the tank when the tank and chamber are in communication; a gauge below the tank, and means for selectively establishing communication between the bottoms of the tank and said chamber, and between said chamber and gauge.

2. In combination, a tank, a member within said tank and forming a chamber of relatively small diameter in which the liquid is adapted to rise to substantially the same height as the liquid within the tank when the tank and chamber are in communication; a gauge below said tank and having a measuring tube, and means for selectively establishing communication between the bottoms of said tank and chamber, and between said chamber and tube.

3. In combination, a tank, means located within and centrally of said tank for forming a chamber in which a column of liquid is adapted to rise to the same height as the liquid within the tank when the tank and chamber are in communication; a gauge below said tank, and means for selectively establishing communication between the bottoms of said tank and chamber, and between said chamber and gauge.

4. In combination, a tank, a stand pipe within said tank, a gauge below said tank, and valve means for establishing communication between the bottom of the tank and the bottom of the stand pipe whereby to admit a column of liquid to be formed in said pipe to the same height as the liquid within said tank, said valve means being arranged to establish communication between said stand pipe and said gauge to permit the column of liquid within the stand pipe to flow into said gauge.

HORACE H. RAYMOND.